(12) United States Patent
Halepovic et al.

(10) Patent No.: US 11,689,600 B1
(45) Date of Patent: Jun. 27, 2023

(54) NETWORK CAPACITY PLANNING BASED ON APPLICATION PERFORMANCE

(71) Applicant: AT&T Intellectual Property I, L.P., Atlanta, GA (US)

(72) Inventors: Emir Halepovic, Somerset, NJ (US); Cheuk Yiu Ip, Metuchen, NJ (US); Vijay Gopalakrishnan, Edison, NJ (US); Edward Allen Lambert, Tucson, AZ (US); Jennifer Yates, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/733,313

(22) Filed: Apr. 29, 2022

(51) Int. Cl.
    *G06F 13/00*     (2006.01)
    *H04L 65/80*     (2022.01)
    *H04L 43/091*     (2022.01)

(52) U.S. Cl.
    CPC ............ *H04L 65/80* (2013.01); *H04L 43/091* (2022.05)

(58) Field of Classification Search
    CPC .............................. H04L 65/80; H04L 43/091
    USPC ......................................... 709/224, 227–229
    See application file for complete search history.

(56) References Cited

U.S. PATENT DOCUMENTS

| | | | | |
|---|---|---|---|---|
| 9,282,007 | B2* | 3/2016 | Effros | H04L 43/50 |
| 10,182,097 | B2* | 1/2019 | Bovik | H04L 41/147 |
| 10,965,538 | B2* | 3/2021 | Effros | H04L 43/50 |
| 2013/0007264 | A1* | 1/2013 | Effros | H04L 43/50 |
| | | | | 709/224 |
| 2016/0191335 | A1* | 6/2016 | Effros | H04L 41/145 |
| | | | | 709/224 |
| 2017/0085617 | A1* | 3/2017 | Bovik | H04L 65/80 |
| 2022/0191592 | A1* | 6/2022 | Gairuboina | H04L 65/612 |

* cited by examiner

*Primary Examiner* — Kenneth R Coulter
(74) *Attorney, Agent, or Firm* — Hartman & Citrin LLC

(57) ABSTRACT

Network capacity planning based on application performance can include detecting a data session occurring on a network, identifying an application being used for the data session, where the application can include a video application, determining if a performance model for the video application exists, the performance model describing performance metrics and quality of service events associated with the video application, determining, based on the performance model, a capacity planning trigger for the video application, where the capacity planning trigger can include increasing network capacity based on the needs and a quality of service associated with the video application during the data session, and generating a command that, when executed by a network entity, causes the network entity to implement the capacity planning trigger on the network.

20 Claims, 9 Drawing Sheets

NETWORK CAPACITY PLANNING BASED ON APPLICATION PERFORMANCE

BACKGROUND

Network operators use various approaches to meet fluctuations in demand in modern networks. Traditionally, networks were inflexible because hardware was added to meet demand at its highest level (saturation) and could not be removed without great expense of time and money. Thus, traditional network planning was based on tracking usage over time and expanding the network as required to meet a baseline, average, and/or peak demand.

In many modern networks, however, virtualized network resources can be flexibly added and/or removed from the networks to meet fluctuations in demand over time. In some example implementations, network capacity can be tracked by one or more monitoring entities and capacity may be increased when usage of the network approaches the capacity of the network. These thresholds may be based on absolute measures of network capacity, meaning that capacity may be increased when the network capacity approaches some carrier-specified threshold value (e.g., a carrier add threshold), which can be set in any number of manners.

Such an approach can result in increased capacity when needed in some implementations, but also may trigger needless or premature capacity augmentation decisions. For example, a spike in demand for a few seconds may result in a capacity addition that will not be needed ten seconds from that time. This problem is compounded by the increase in video-based traffic on many networks.

In particular, video sessions may use adaptive video streaming, meaning video quality (often represented by encoding bitrate) may be adapted based on network conditions such as capacity. Small phone screens may not require high video bitrate to provide good quality and customer experience. If video applications are given an opportunity to stream at high bitrates above the true need for a good customer experience, the video applications may generate excess network traffic that might push the forecast to trigger capacity augmentation prematurely.

SUMMARY

The present disclosure is directed to network capacity planning based on application performance. Embodiments of the concepts and technologies disclosed herein can incorporate application-level performance measurement into capacity planning to prevent premature capacity augmentation (radio carrier add) decisions. Additionally, these embodiments of the concepts and technologies disclosed herein can determine QoS needs for the applications to ensure that data usage matches what is needed to deliver promised and/or expected QoS without devoting unnecessary resources to increase QoS for no reason. Capacity increases can be triggered by application-specific QoS needs and/or performance metrics instead of blindly relying on absolute network capacity information, network demand information, and/or network usage information.

A user device such as a smartphone, desktop computer, vehicle computing system, or the like can execute one or more application programs such as a web browser, a video application, a streaming music application, another application, or the like, which may communicate with an application server to obtain certain functionality from the network. The application programs can transmit, receive, and/or otherwise exchange session data with an application server for various purposes (e.g., for banking applications, mail services, video services, gaming services, etc.). In various embodiments, a network monitor or other network entity can be configured to detect the data session associated with the exchange of session data between the user device and the application server. A capacity planning service can be hosted and/or executed by a server computer. The capacity planning service can be configured to receive one or more device activity reports from the network monitor and/or other devices or entities. The device activity reports can identify an application being used for the data session, session performance metrics (e.g., how much data is consumed by the application over time and what level of data consumption is needed to meet application demands over time).

The performance model therefore can capture indications of how much data is used for the application over time for a QoS that meets network provider guidelines (e.g., meeting customer expectations). Thus, the performance model can not only reflect (e.g., model) historical usage of an application, but also depict QoS requirements associated with the application. Thus, if an application flow that was used to create the performance model occurred at a time at which the network was saturated, the application requirements may still be known and used to adjust network capacity instead of merely using historical information alone. It should be understood that this example is illustrative, and therefore should not be construed as being limiting in any way.

The performance model can be stored and used for future use by the capacity planning service. In particular, the capacity planning service can detect a data session using an application at some time. In some embodiments, the capacity planning service detects the data session by receiving a device activity report from the network monitor or other devices. In some other embodiments, the capacity planning service can be configured to monitor network traffic and infer or conclude based on the traffic that a particular application is being used for a data session. Of course, the capacity planning service can determine the application is being used for a data session in additional and/or alternative manners. Regardless of how this determination is made, the capacity planning service can determine if a performance model associated with the application is stored and, if so, can retrieve or obtain the performance model for use in capacity planning.

The capacity planning service can determine, based on the performance model, one or more capacity planning triggers for the application and generate one or more commands. The commands can cause one or more devices associated with the network to implement the determined capacity planning triggers by adjusting capacity associated with the network. Thus, the capacity planning service can make and implement capacity planning decisions without determining network capacity and instead by determining or projecting application needs. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting a data session occurring on a network between a user device and an application server, identifying an application being used for the data session, wherein the application can include a video application, determining if a performance model for the video application exists, wherein the performance model describes performance metrics and quality of service events associated with the video application, determining, based on the performance model, a capacity planning trigger for the video application, wherein the capacity planning trigger can include increasing network capacity based on the needs and a quality of service associated with the video application during the data session, and generating a command that, when executed by a network entity, causes the network entity to implement the capacity planning trigger on the network.

In some embodiments, the operations further can include receiving a device activity report that can include session performance metrics for a previous use of the video application, the session performance metrics including quality of service experienced by the user device during a video session and network capacities during the video session; determining, based on the device activity report, the performance metrics and the quality of service events associated with the video application; generating the performance model for the video application based on the performance metrics and the quality of service events; and storing the performance model. In some embodiments, the quality of service events can include a first quality of service experienced at the user device during a video session using the video application and a second quality of service experienced at the user device during the video session using the video application. The first quality of service can correspond to a quality of service that was experienced when the network was operating at a first capacity level, and the second quality of service can correspond to a quality of service that was experienced when the network was operating at a second capacity level.

In some embodiments, the data session can include a video session occurring between the user device and the application server, wherein the application server hosts a video service. In some embodiments, detecting the data session can include receiving a device activity report that is generated by a network monitor. In some embodiments, the network entity can include an orchestration service, and generating the command can include generating executable code and sending the executable code to the orchestration service. In some embodiments, the capacity planning trigger can be based on application performance and not based on network capacity.

According to another aspect of the concepts and technologies disclosed herein, a method is disclosed. The method can include detecting, at a server computer including a processor, a data session occurring on a network between a user device and an application server; identifying, by the server computer, an application being used for the data session, wherein the application can include a video application; determining, by the server computer, if a performance model for the video application exists, wherein the performance model describes performance metrics and quality of service events associated with the video application; determining, by the server computer and based on the performance model, a capacity planning trigger for the video application, wherein the capacity planning trigger can include increasing network capacity based on the needs and a quality of service associated with the video application during the data session; and generating, by the server computer, a command that, when executed by a network entity, causes the network entity to implement the capacity planning trigger on the network.

In some embodiments, the method further can include receiving a device activity report that can include session performance metrics for a previous use of the video application, the session performance metrics including quality of service experienced by the user device during a video session and network capacities during the video session; determining, based on the device activity report, the performance metrics and the quality of service events associated with the video application; generating the performance model for the video application based on the performance metrics and the quality of service events; and storing the performance model. In some embodiments, the quality of service events can include a first quality of service experienced at the user device during a video session using the video application and a second quality of service experienced at the user device during the video session using the video application. The first quality of service can correspond to a quality of service that was experienced when the network was operating at a first capacity level, and the second quality of service can correspond to a quality of service that was experienced when the network was operating at a second capacity level.

In some embodiments, the data session can include a video session occurring between the user device and the application server, wherein the application server hosts a video service. In some embodiments, detecting the data session can include receiving a device activity report that is generated by a network monitor. In some embodiments, the network entity can include an orchestration service, and generating the command can include generating executable code and sending the executable code to the orchestration service. In some embodiments, the capacity planning trigger can be based on application performance and not based on network capacity.

According to yet another aspect of the concepts and technologies disclosed herein, a computer storage medium is disclosed. The computer storage medium can store computer-executable instructions that, when executed by a processor, cause the processor to perform operations. The operations can include detecting a data session occurring on a network between a user device and an application server, identifying an application being used for the data session, wherein the application can include a video application, determining if a performance model for the video application exists, wherein the performance model describes performance metrics and quality of service events associated with the video application, determining, based on the performance model, a capacity planning trigger for the video application, wherein the capacity planning trigger can include increasing network capacity based on the needs and a quality of service associated with the video application during the data session, and generating a command that, when executed by a network entity, causes the network entity to implement the capacity planning trigger on the network.

In some embodiments, the operations further can include receiving a device activity report that can include session performance metrics for a previous use of the video application, the session performance metrics including quality of service experienced by the user device during a video session and network capacities during the video session; determining, based on the device activity report, the performance metrics and the quality of service events associated with the video application; generating the performance model for the video application based on the performance metrics and the quality of service events; and storing the performance model. In some embodiments, the quality of service events can include a first quality of service experienced at the user device during a video session using the video application and a second quality of service experienced at the user device during the video session using the video application. The first quality of service can correspond to a quality of service that was experienced when the network was operating at a first capacity level, and the second quality of service can correspond to a quality of service that was experienced when the network was operating at a second capacity level.

In some embodiments, the data session can include a video session occurring between the user device and the application server, wherein the application server hosts a video service. In some embodiments, detecting the data session can include receiving a device activity report that is generated by a network monitor. In some embodiments, the network entity can include an orchestration service, and generating the command can include generating executable code and sending the executable code to the orchestration service. In some embodiments, the capacity planning trigger can be based on application performance and not based on network capacity.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
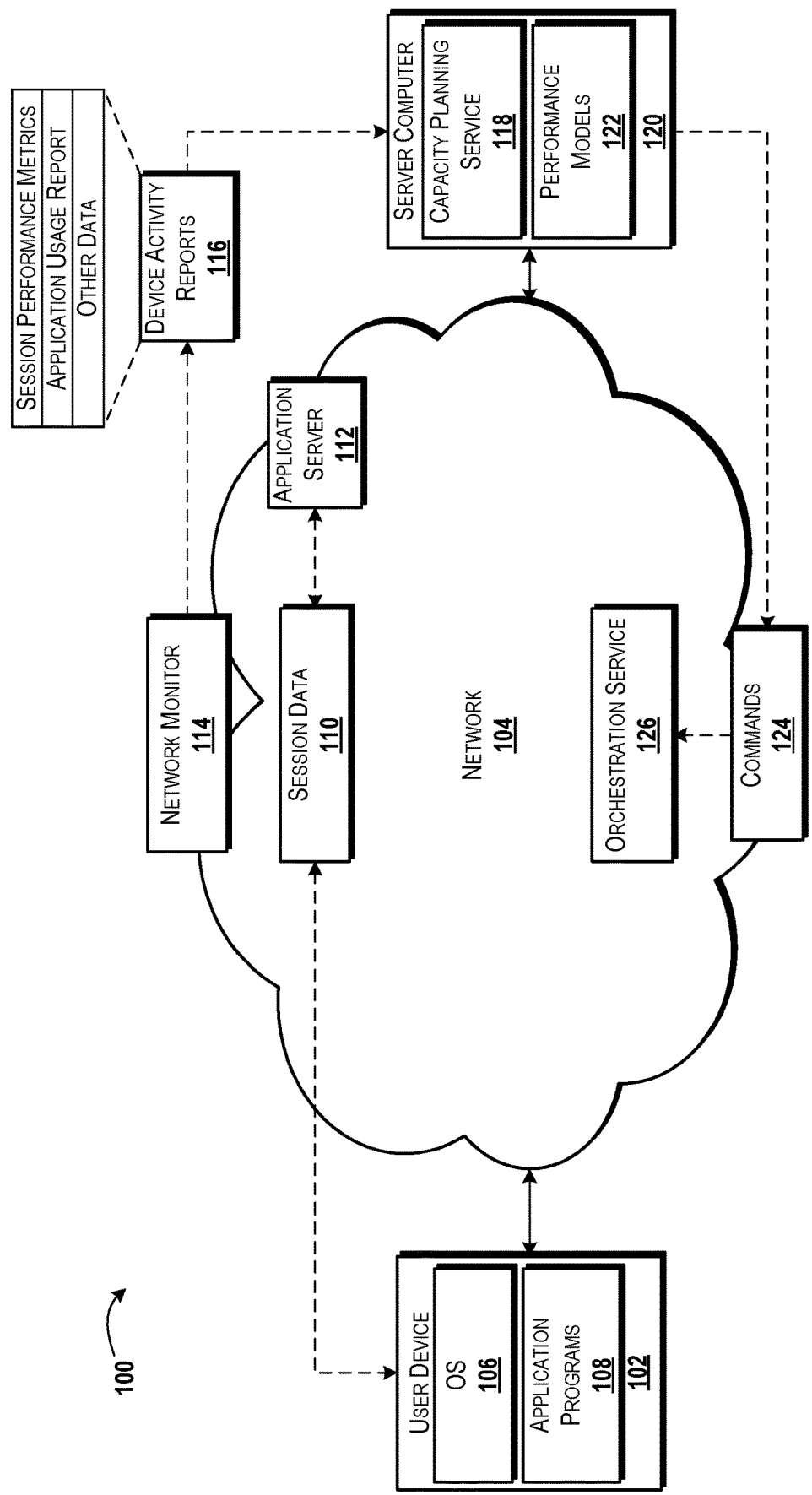
FIG. 1 is a system diagram illustrating an illustrative operating environment for various embodiments of the concepts and technologies described herein.

The following detailed description is directed to network capacity planning based on application performance. A user device such as a smartphone, desktop computer, vehicle computing system, or the like can execute one or more application programs such as a web browser, a video application, a streaming music application, another application, or the like, which may communicate with an application server to obtain certain functionality from the network. The application programs can transmit, receive, and/or otherwise exchange session data with an application server for various purposes (e.g., for banking applications, mail services, video services, gaming services, etc.). In various embodiments, a network monitor or other network entity can be configured to detect the data session associated with the exchange of session data between the user device and the application server. A capacity planning service can be hosted and/or executed by a server computer. The capacity planning service can be configured to receive one or more device activity reports from the network monitor and/or other devices or entities. The device activity reports can identify an application being used for the data session, session performance metrics (e.g., how much data is consumed by the application over time and what level of data consumption is needed to meet application demands over time).

The performance model therefore can capture indications of how much data is used for the application over time for a QoS that meets network provider guidelines (e.g., meeting customer expectations). Thus, the performance model can not only reflect (e.g., model) historical usage of an application, but also depict QoS requirements associated with the application. Thus, if an application flow that was used to create the performance model occurred at a time at which the network was saturated, the application requirements may still be known and used to adjust network capacity instead of merely using historical information alone. It should be understood that this example is illustrative, and therefore should not be construed as being limiting in any way.

The performance model can be stored and used for future use by the capacity planning service. In particular, the capacity planning service can detect a data session using an application at some time. In some embodiments, the capacity planning service detects the data session by receiving a device activity report from the network monitor or other devices. In some other embodiments, the capacity planning service can be configured to monitor network traffic and infer or conclude based on the traffic that a particular application is being used for a data session. Of course, the capacity planning service can determine the application is being used for a data session in additional and/or alternative manners. Regardless of how this determination is made, the capacity planning service can determine if a performance model associated with the application is stored and, if so, can retrieve or obtain the performance model for use in capacity planning.

The capacity planning service can determine, based on the performance model, one or more capacity planning triggers for the application and generate one or more commands. The commands can cause one or more devices associated with the network to implement the determined capacity planning triggers by adjusting capacity associated with the network. Thus, the capacity planning service can make and implement capacity planning decisions without determining network capacity and instead by determining or projecting application needs. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for network capacity planning based on application performance will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more desktop computers, laptop computers, mobile telephones, smartphones, vehicle computing systems, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone or mobile computing device. It should be understood that this embodiment is illustrative and should not be construed as being limiting in any way.

The user device 102 can execute an operating system 106 and one or more application programs 108. The operating system 106 can include a computer program that can control the operation of the user device 102. The application programs 108 can include any number of executable programs that can be configured to execute on top of the operating system 106 to provide various functions. According to various embodiments, the application programs 108 can include web browsers, mail applications, mobility applications, native applications, utilities, combinations thereof, or the like. While the application programs 108 can include applications that do not involve or result in any network consumption (e.g., voice and/or data consumption), embodiments of the concepts and technologies disclosed herein can be configured to capture data accessed by, generated by, transmitted by, and/or exchanged by or with the application programs 108. It should be understood that this example is illustrative, and therefore should not be construed as being limiting in any way.

According to various embodiments of the concepts and technologies disclosed herein, the application programs 108 can be configured to generate, obtain, download, upload, exchange, send and/or otherwise use a data session enabled by the network 104. Data exchanged during any such data session is referred to herein as session data 110. Thus, it can be appreciated that the session data 110 can include any data sent to or by the user device 102 during use of one of the application programs 108. According to various embodiments of the concepts and technologies disclosed herein, the session data 110 can be obtained from and/or sent to an application server 112. It should be understood that this example is illustrative, and therefore should not be construed as being limiting in any way.

According to various embodiments, the functionality of the application server 112 may be provided by one or more real or virtual server computers, virtual machines, web servers, application servers, desktop computers, laptop computers, mobile telephones, smartphones, other computing systems, and the like. It should be understood that the functionality of the application server 112 may be provided by a single device, by two or more similar devices, and/or by two or more dissimilar devices. For purposes of describing the concepts and technologies disclosed herein, the application server 112 is described herein as a web server that executes and/or hosts an application or service that is accessed by at least one of the application programs 108. It should be understood that this embodiment is illustrative and should not be construed as being limiting in any way.

The application server 112 can be configured to send the session data 110 to the user device 102 and/or to receive the session data 110 from the user device 102 during the data session. In some embodiments, the application server 112 can correspond to a video server, and the session data 110 therefore can include one or more requests (e.g., requests for video from the user device 102) and/or video data (e.g., multimedia provided to the user device 102 in response to the requests). In some other embodiments, the application server 112 can correspond to a mail server, and the session data 110 therefore can include one or more messages or requests for messages from the user device 102 and/or mail data (e.g., mail messages, mail waiting indicators, etc.) that can be provided to the user device 102. Because many other types of data can be exchanged between the user device 102 and the application server 112, it should be understood that these examples are illustrative, and therefore should not be construed as being limiting in any way.

According to various embodiments of the concepts and technologies disclosed herein, the operating environment 100 also can include a network monitor 114. The network monitor 114 can be configured to monitor one or more devices on or in communication with the network 104 such as, for example, the user device 102 and/or the application server 112. The network monitor 114 can be configured to determine that a data session is occurring. In some embodiments, for example, the network monitor 114 can determine that the data session is occurring by detecting the data session while monitoring the network 104, by receiving indications from one or more parties to the data session that the data session is occurring (e.g., from the user device 102 and/or from the application server 112), by receiving indicators from other devices or entities on or in communication with the network 104 that the data session is occurring, and/or in other manners. Because the network monitor 114 can determine that a data session is occurring in additional and/or alternative manners, it should be understood that these examples are illustrative, and therefore should not be construed as being limiting in any way.

In response to detecting the data session, the network monitor 114 can be configured to monitor the data session and capture information relating to the data session. According to various embodiments, the data captured by the network monitor 114 can include, for example, contextual information associated with the data session such as, for example, identification of the application being used by the user device 102 to send or receive the data; a geographic location of the user device 102 during the session; network performance metrics such as uplink speed associated with the data channel providing the data session, downlink speed associated with the data channel providing the data session, latency associated with the data channel providing the data session, duration of the data session, elasticity of the data session (e.g., how much the consumption fluctuates over time); capacity planning events associated with the data session (e.g., capacity increases, bandwidth consumption, bandwidth thresholds, and the like); combinations thereof; or the like. Because the data captured by the network monitor 114 can include additional and/or alternative information, it should be understood that these examples are illustrative, and therefore should not be construed as being limiting in any way.

These and other data can be captured by the network monitor 114 and included in a device activity report 116. The device activity reports 116 also can include alerts or information indicating that a device is involved in a data session, as will be explained in more detail below. The network monitor 114 can be configured to generate the device activity reports 116 and to send the device activity reports 116 to a capacity planning service 118. In some embodiments, the capacity planning service 118 can be hosted and/or executed by a device such as a server computer 120. It should be understood that this example is illustrative, and therefore should not be construed as being limiting in any way.

The capacity planning service 118 can be configured to obtain the device activity reports 116 from the network monitor 114 (or other devices) and to use the device activity reports 116 to generate one or more performance models 122. The performance models 122 can include, in some embodiments, machine learning models and/or other types of models that can define, for a particular application a model or simulation of expected data consumption and/or network planning actions during a data session involving that application. In some embodiments, the capacity planning service 118 can be configured to receive a device activity report 116, to identify an application associated with the device activity report 116, to determine one or more performance metrics associated with the application during the data session (e.g., bandwidth consumption, bandwidth needs, network responses to bandwidth consumption and/or needs, other resource usage and/or planning, combinations thereof, or the like).

The capacity planning service 118 also can be configured to track QoS events for the session. QoS events can include network capacity increase events, network capacity decrease events, prioritization of data, and/or other actions that may affect the capacity dedicated to the data session and the quality of the data session. Based on the application, the performance metrics, and the QoS events, the capacity planning service 118 can generate a performance model 122 for the usage (of that application).

According to various embodiments of the concepts and technologies disclosed herein, the performance model 122 can define, for a particular application, an expected data consumption associated with the application, an expected capacity usage associated with the application, network planning events during the data session, perceived and/or actual QoS metrics (as perceived at the user device 102, the network 104, and/or the application server 112), and/or other data session information. This performance model 122 can include, in some embodiments, a machine learning model, an algorithm set, and/or other functionality for emulating the performance of the application. It should be understood that this example is illustrative, and therefore should not be construed as being limiting in any way.

The capacity planning service 118 can store the performance models 122 locally and/or at a remote data storage location such as a hard drive, memory, database, data server, or the like. Because the performance models 122 can be stored at additional and/or alternative locations, it should be understood that these examples are illustrative, and therefore should not be construed as being limiting in any way.

At some time, as noted above, a device such as the user device 102 can join a data session. The data session can involve a particular application and can include the user device 102 and the application server 112. Other devices are possible and are contemplated, but these devices are used to simplify the description of the embodiments of the concepts and technologies disclosed herein. The network monitor 114, as noted above, can detect the data session and report this data session to the capacity planning service 118 (e.g., via sending a device activity report 116).

The capacity planning service 118 can be configured to detect the data session (e.g., by receiving the device activity report 116 that includes an application usage report, for example) and to identify an application being used for the data session. In some embodiments of the concepts and technologies disclosed herein, the capacity planning service 118 can be configured to infer, from various types of network traffic, what applications are being used (e.g., without receiving any identification of the application explicitly by way of the device activity reports 116). Because the server computer 120 can determine explicitly or implicitly what application is being used in a variety of manners, it should be understood that these examples are illustrative, and therefore should not be construed as being limiting in any way.

The capacity planning service 118 can determine if any of the performance models 122 relate to the application being used. It can be appreciated that the performance models 122 can include data identifying applications, so the capacity planning service 118 can be configured in some embodiments to identify what application is being used and the performance model 122 that relates to that application. If the capacity planning service 118 determines that no performance model 122 associated with that particular application exists, the capacity planning service 118 can monitor the traffic and make capacity planning decisions. In some embodiments, the capacity planning service 118 can make these capacity planning decisions based on application flows to project capacity changes. It should be understood that this example is illustrative, and therefore should not be construed as being limiting in any way.

If the capacity planning service 118 determines that a performance model 122 exists for the application identified, the capacity planning service 118 can retrieve the performance model 122. The capacity planning service 118 can determine, based on the performance model 122, one or more capacity planning trigger events ("capacity planning triggers") for the application. For example, the performance model 122 can be based on captured usage associated with the application and therefore can indicate expected network resource (e.g., bandwidth) consumption by the application over time. For example, the performance model 122 could indicate, for a particular application, that the application is expected to consume a data volume of five hundred kilobits per second ("kbps") for the first five minutes of application use, followed by nine hundred kbps for the next ten minutes of application use, then returning to five hundred kbps until the application usage ceases. It should be understood that this example is illustrative, and therefore should not be construed as being limiting in any way.

In the above example, instead of examining network usage and/or data volume on the network, the capacity planning service 118 can use the performance model 122 to project a capacity increase at an application time of five minutes, with that increase lasting ten minutes. Based on this information, the capacity planning service 118 can create at least two capacity planning triggers. The first capacity planning trigger can be set to increase network capacity dedicated to the application from its initial level (assumed to be five hundred kbps for this example) to a level of nine hundred kbps at five minutes of application time. The second capacity planning trigger can be set to reduce the capacity dedicated to the application from nine hundred kbps to five hundred kbps at fifteen minutes of application use. Thus, the capacity planning service 118 can effect proactive network capacity planning based on the type of application being used and the performance metrics for the application as captured by the performance model 122. It should be understood that this example is illustrative, and therefore should not be construed as being limiting in any way.

The capacity planning service 118 can be configured to generate one or more commands 124 based on the determined capacity planning triggers. The commands 124 can include executable code that, when executed by a device such as an orchestration service 126, can cause the orchestration service 126 to modify operations of the network 104 and/or one or more devices thereon to implement the determined capacity planning triggers for the application. In the above example, the commands 124 can include a first command 124 that will cause the orchestration service 126 and/or other devices to increase network capacity dedicated to the application from its initial level (assumed to be five hundred kbps for this example) to a level of nine hundred kbps at five minutes of application time.

The second command 124 can cause the orchestration service 126 and/or other devices to reduce the capacity dedicated to the application from nine hundred kbps to five hundred kbps at fifteen minutes of application use. As such, it can be appreciated that network capacity planning actions can be taken by embodiments of the concepts and technologies disclosed herein to adjust network capacity based on application data volume instead of network data volumes. Thus, embodiments of the concepts and technologies disclosed herein can adjust capacity of the network 104 based on the application and not based on the network 104 usage. It should be understood that this example is illustrative, and therefore should not be construed as being limiting in any way.

In practice, a user device 102 can execute one or more application programs 108. The application programs 108 can transmit, receive, and/or otherwise exchange session data 110 with an application server 112 for various purposes (e.g., for banking applications, mail services, video services, gaming services, etc.). A network monitor 114 can be configured to detect the data session associated with the exchange of session data 110 between the user device 102 and the application server 112. A capacity planning service 118 can be configured to receive one or more device activity reports 116 from the network monitor 114 and/or other devices or entities. The device activity reports 116 can identify an application being used for the data session, session performance metrics (e.g., how much data is consumed by the application over time and what level of data consumption is needed to meet application demands over time).

The performance model 122 therefore can capture indications of how much data is used for the application over time for a QoS that meets network provider guidelines (e.g., meeting customer expectations). Thus, the performance model 122 can not only reflect (e.g., model) historical usage of an application, but also depict QoS requirements associated with the application. Thus, if an application flow that was used to create the performance model 122 occurred at a time at which the network was saturated, the application requirements may still be known and used to adjust network capacity instead of merely using historical information alone. It should be understood that this example is illustrative, and therefore should not be construed as being limiting in any way.

The performance model 122 can be stored and used for future use by the capacity planning service 118. In particular, the capacity planning service 118 can detect a data session using an application at some time. In some embodiments, the capacity planning service 118 detects the data session by receiving a device activity report 116 from the network monitor 114 or other devices. In some other embodiments, the capacity planning service 118 can be configured to monitor network traffic and infer or conclude based on the traffic that a particular application is being used for a data session. Of course, the capacity planning service 118 can determine the application is being used for a data session in additional and/or alternative manners. Regardless of how this determination is made, the capacity planning service 118 can determine if a performance model 122 associated with the application is stored and, if so, can retrieve or obtain the performance model 122 for use in capacity planning.

The capacity planning service 118 can determine, based on the performance model 122, one or more capacity planning triggers for the application and generate one or more commands 124. The commands 124 can cause one or more devices associated with the network 104 to implement the determined capacity planning triggers by adjusting capacity associated with the network 104. Thus, the capacity planning service 118 can make and implement capacity planning decisions without determining network capacity and instead by determining or projecting application needs. It should be understood that this example is illustrative, and therefore should not be construed as being limiting in any way.

FIG. 1 illustrates one user device 102, one network 104, one application server 112, one network monitor 114, one server computer 120, and one orchestration service 126. It should be understood, however, that various implementations of the operating environment 100 can include zero, one, or more than one user device 102; one or more than one network 104; zero, one, or more than one application server 112; zero, one, or more than one network monitor 114; zero, one, or more than one server computer 120; and/or zero, one, or more than one orchestration service 126. As such, the illustrated embodiment should be understood as being illustrative, and should not be construed as being limiting in any way.

Figure 2:
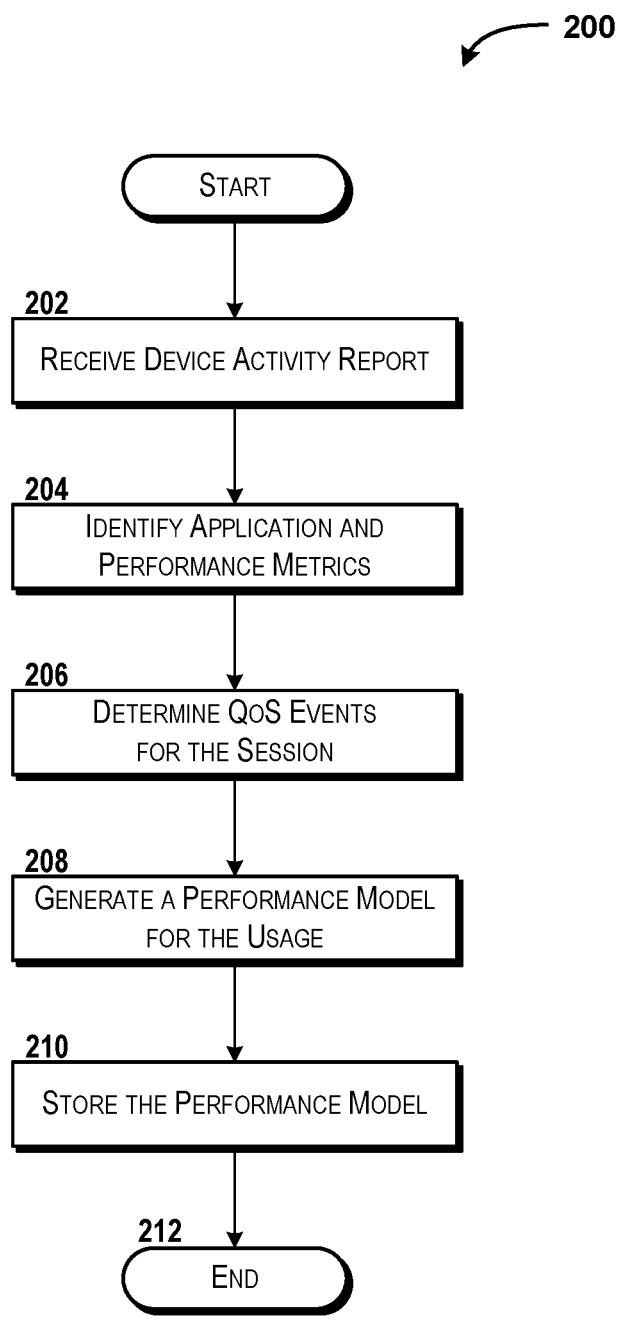
FIG. 2 is a flow diagram showing aspects of a method for generating application performance models for use in network capacity planning, according to an illustrative embodiment of the concepts and technologies described herein.

Turning now to FIG. 2, aspects of a method 200 for generating application performance models for use in network capacity planning will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 120, to perform one or more operations and/or causing the processor to direct other components of the computing system or device to perform one or more of the operations.

For purposes of illustrating and describing the concepts of the present disclosure, the method 200 is described herein as being performed by the server computer 120 via execution of one or more software modules such as, for example, the capacity planning service 118. It should be understood that additional and/or alternative devices and/or network nodes can provide the functionality described herein via execution of one or more modules, applications, and/or other software including, but not limited to, the capacity planning service 118. Thus, the illustrated embodiments are illustrative, and should not be viewed as being limiting in any way.

The method 200 begins at operation 202. At operation 202, the server computer 120 can receive a device activity report such as the device activity reports 116 illustrated and described above with reference to FIG. 1. The device activity reports 116 can be generated by a network monitor 114 and/or other device or entity associated with the network 104 and provided to the server computer 120.

The device activity reports 116 can include various types of information such as, for example, an identification of an application being used in a data session between a user device 102 and an application server 112, session performance metrics associated with the data session (e.g., data consumed by the application, application needs associated with the application during the application-based data session, network capacity dedicated to the application during the application-based data session, combinations thereof, or the like), and/or other data such as location information, roaming information, time of day information, data session duration information, and the like. The server computer 120 can receive the device activity reports 116 at various times such as, for example, periodically during a data session, at the end of the data session, and/or at other times.

While in various example embodiments described herein the network monitor 114 and/or other network entity creates and provides the device activity reports 116, it should be understood that in some embodiments the user device 102 can execute an application that tracks data sessions for one or more applications, data used during the session, QoS during the data session, and the like. Thus, the user device 102 can be configured, in some embodiments, to provide the device activity reports 116 to the server computer 120 in some embodiments, though this is not shown in FIG. 1. It should be understood that these examples are illustrative, and therefore should not be construed as being limiting in any way.

From operation 202, the method 200 can proceed to operation 204. At operation 204, the server computer 120 can identify an application associated with the device activity report 116 and one or more performance metrics associated with the use of the application. As noted herein, some embodiments of the concepts and technologies disclosed herein may be used specifically for video applications (and/or may plan for video applications independently of other network capacity planning), so operation 204 may correspond to the server computer 120 determining if a video application is being used and identifying the video application being used. If the server computer 120 determines that non-video applications are being used, the server computer 120 can be configured to end the method 200 at this point in some embodiments. It should be understood that this example is illustrative, and therefore should not be construed as being limiting in any way.

The performance metrics can be determined, in various embodiments, from the session performance metrics included in the device activity reports 116. The performance metrics can describe application data consumption at one or more points in time during a data session using the application. Thus, the performance metrics can define how much data was consumed (or requested by the application) during the application-based data session. Thus, the performance metrics can be used to determine or infer application data requirements in various embodiments.

From operation 204, the method 200 can proceed to operation 206. At operation 206, the server computer 120 can determine one or more QoS events for the session. The QoS events can describe how much data was provided to the user device 102 (or other device) during the application-based data session at various times and whether the application needs were satisfied or not. Thus, the QoS events can be used to determine (or infer) how the network increased capacity during the use of the application in a data session; allocated bandwidth realized by the user device 102 during the data session; what triggers and/or thresholds were applied by the network 104 during the data session; how the application performed based on the allocated data resources during the application-based data session; what the maximum data resource consumption of the application was during the data session; what the minimum data resource consumption of the application was during the data session; time values associated with any data resource need changes during the data session (e.g., how many milliseconds, seconds, or minutes into application execution the data needs changed, etc.); combinations thereof; or the like. This and/or other information can be determined from the session performance metrics and/or other information. It should be understood that this example is illustrative, and therefore should not be construed as being limiting in any way.

From operation 206, the method 200 can proceed to operation 208. At operation 208, the server computer 120 can generate a performance model 122 for the usage of the application. The performance model 122 can capture the application, performance metrics, and QoS events (among other data) and therefore can define how and when data needs to change during an application-based data session. In various embodiments of the concepts and technologies disclosed herein, machine learning and/or artificial intelligence can be used to develop the performance models 122 using the performance metrics, the QoS events, and/or other data as inputs for the model building. Thus, the performance model 122 can simulate a data session for the application, data needs during the application-based data session, and QoS that will result based on data needs and/or data provided during an application-based data session. It should be understood that this example is illustrative, and therefore should not be construed as being limiting in any way.

From operation 208, the method 200 can proceed to operation 210. At operation 210, the server computer 120 can store the performance model 122. According to various embodiments of the concepts and technologies disclosed herein, the performance model 122 can be stored in a local data storage device (e.g., a local data storage resource, a local drive or other data storage device, combinations thereof, or the like); a remote data storage device (e.g., a data store, a remote storage device, a remote storage resource, combinations thereof, or the like); or the like. The performance models 122 can be stored with data that identified the associated application and, in some embodiments, a user device 102 used for the data session captured by the performance models 122, time of day information associated with the performance models 122, location information associated with the performance models 122, combinations thereof, or the like. The performance models 122 can be used for various purposes as illustrated and described herein.

From operation 210, the method 200 can proceed to operation 212. The method 200 can end at operation 212.

Figure 3:
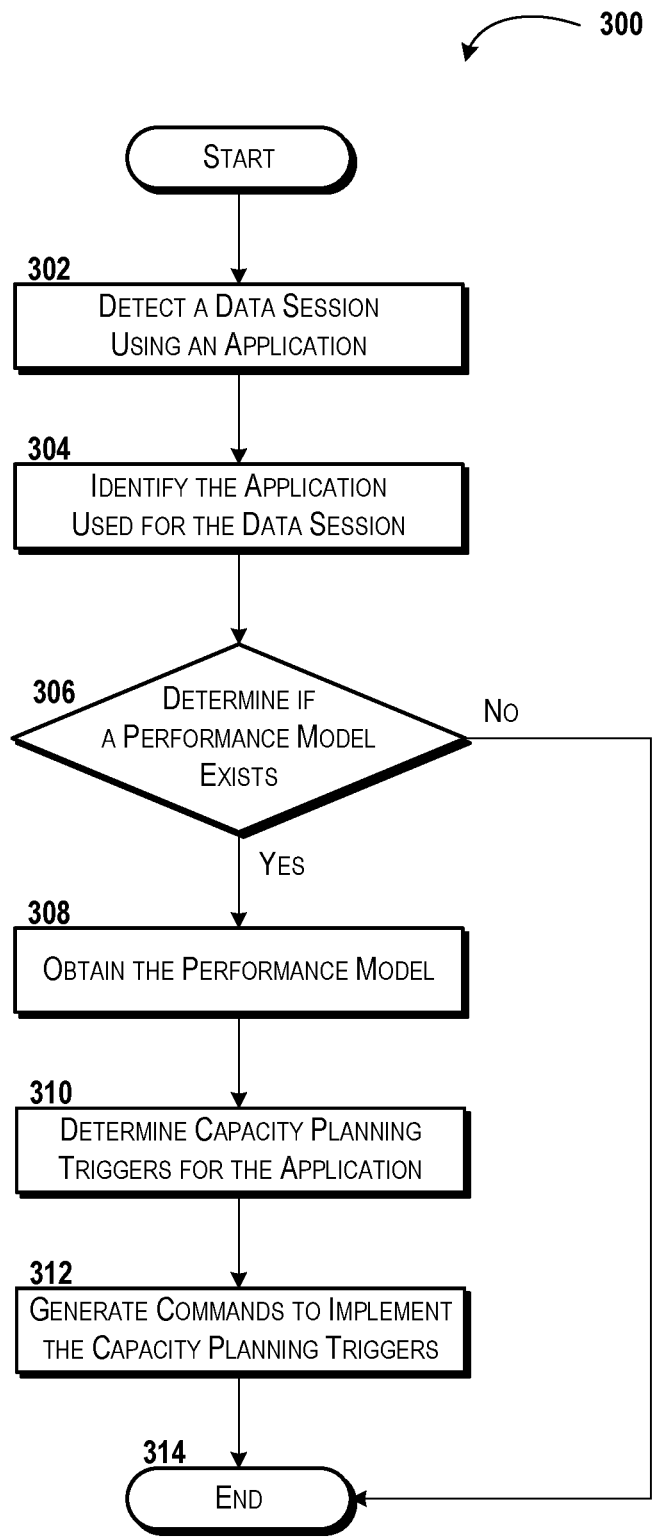
FIG. 3 is a flow diagram showing aspects of a method for performing network capacity planning based on application performance, according to an illustrative embodiment of the concepts and technologies described herein.

Turning now to FIG. 3, aspects of a method 300 for performing network capacity planning based on application performance will be described in detail, according to an illustrative embodiment. For purposes of illustrating and describing the concepts of the present disclosure, the method 300 is described herein as being performed by the server computer 120 via execution of one or more software modules such as, for example, the capacity planning service 118. It should be understood that additional and/or alternative devices and/or network nodes can provide the functionality described herein via execution of one or more modules, applications, and/or other software including, but not limited to, the capacity planning service 118. Thus, the illustrated embodiments are illustrative, and should not be viewed as being limiting in any way.

The method 300 begins at operation 302. At operation 302, the server computer 120 can detect a data session using an application. As explained above, the server computer 120 can detect a data session based on information (e.g., device activity reports 116) that can be received from one or more devices such as, for example, the network monitor 114, the user device 102, other entities associated with the network 104, or the like. The information received from the one or more devices in operation 302 can refer to an active data session occurring via the network 104.

In some embodiments of the concepts and technologies disclosed herein, a user or other entity (e.g., a user of the user device 102 that is involved in the data session detected in operation 302) can be given an opportunity to opt-in or opt-out of the functionality provided by the capacity planning service 118 and as such, the data session detected in operation 302 can be associated with a user or other entity that has opted in for the capacity planning service 118. Because the data session can be detected in additional and/or alternative manners, it should be understood that the above examples are illustrative, and therefore should not be construed as being limiting in any way.

From operation 302, the method 300 can proceed to operation 304. At operation 304, the server computer 120 can identify the application being used for the data session detected in operation 302. According to various embodiments of the concepts and technologies disclosed herein, the application can be identified specifically in the reported activity (e.g., an application usage report included as part of the device activity report 116, an explicit application identifier received from the user device 102 or other entity, or the like). As noted herein, some embodiments of the concepts and technologies disclosed herein may be used specifically for video applications (and/or may plan for video applications independently of other network capacity planning), so operation 304 may include an operation for determining if a video application is being used and identifying the video application being used. If non-video applications are being used, the server computer 120 can be configured to end the method 300 at this point. It should be understood that this example is illustrative, and therefore should not be construed as being limiting in any way.

In some other embodiments of the concepts and technologies disclosed herein, the identity of the application being used in the data session can be determined or inferred by examining network traffic associated with the data session and determining that the activity is similar to traffic associated with a particular application. In some embodiments, some or all data flows can be labeled (e.g., in packet headers) by the network 104 to identify applications being used, and this information can be accessed to determine the application in some embodiments. Because the application can be determined in additional and/or alternative manners, it should be understood that the above examples are illustrative, and therefore should not be construed as being limiting in any way.

From operation 304, the method 300 can proceed to operation 306. At operation 306, the server computer 120 can determine if a performance model 122 exists for the application being used. According to various embodiments of the concepts and technologies disclosed herein, the server computer 120 can query or search a local or remote data storage resource or device to determine if any performance model 122 is stored for the application identified in operation 304. Thus, operation 306 can correspond to determining, based on the search or a response to the query, if the performance model 122 for the application does or does not exist. Because the server computer 120 can determine if a performance model 122 exists for the application in additional or alternative manners, it should be understood that these examples are illustrative, and therefore should not be construed as being limiting in any way.

If the server computer 120 determines, in operation 306, that a performance model 122 exists for the application identified in operation 304, the method 300 can proceed to operation 308. At operation 308, the server computer 120 can obtain the performance model 122 from the local or remote data storage resource. Thus, operation 308 can correspond to the server computer 120 retrieving the performance model 122 from a memory, drive, or data storage resource; to requesting and receiving the performance model 122 from one or more other devices; or the like.

From operation 308, the method 300 can proceed to operation 310. At operation 310, the server computer 120 can determine one or more capacity planning triggers for the application identified in operation 304. As explained above with reference to FIG. 2, the performance models 122 can define capacity planning events, effects of the capacity planning events on the application, QoS events for one or more sessions using the application, and/or other aspects of application performance and/or network capacity planning associated with use of the application. Thus, operation 310 can include the server computer 120 analyzing the performance model 122 to determine one or more capacity planning triggers to be implemented during the data session to meet the expected or promised QoS for the device involved in the data session.

As explained above, the capacity planning triggers can include times (during execution of the application) that data usage (e.g., bandwidth) requirements for the application may change; how the data usage (e.g., bandwidth) requirements (e.g., how much bandwidth is required, prioritization for data for the session, etc.) for the application may change; and the like. Thus, the server computer 120 can be configured to determine, based on the performance models 122, one or more times that network capacity dedicated to the application should be increased or decreased in a particular data session to meet expected and/or promised QoS for a device in the data session. Because other capacity planning triggers can be determined in operation 310 as illustrated and described herein, it should be understood that these examples are illustrative, and therefore should not be construed as being limiting in any way.

From operation 310, the method 300 can proceed to operation 312. At operation 312, the server computer 120 can generate one or more commands 124 to implement the capacity planning triggers determined in operation 310. As explained above, the commands 124 can include executable code that, when executed by the orchestration service 126 and/or other devices or entities on the network 104, can implement the capacity planning triggers determined in operation 310. Generating the commands 124 in operation 312 can include delivering or triggering delivery of the commands 124 to one or more devices or other entities associated with the network 104. In the example embodiment shown in FIG. 1, the commands 124 can be delivered to the orchestration service 126. It should be understood that this example is illustrative, and therefore should not be construed as being limiting in any way.

Upon receiving the commands 124 from the server computer 120, the orchestration service 126 (or other device or entity) can implement the commands 124 to implement the capacity planning triggers on the network 104 for the data session. Thus, embodiments of the concepts and technologies disclosed herein can implement capacity planning using application performance (e.g., as captured by performance models 122) instead of triggering network capacity changes based on network utilization. It should be understood that this example is illustrative, and therefore should not be construed as being limiting in any way.

From operation 312, the method 300 can proceed to operation 314. The method 300 also can proceed to operation 314 if the server computer 120 determines, in operation 306, that a performance model 122 does not exist for the application identified in operation 304. The method 300 can end at operation 314.

Figure 4A:
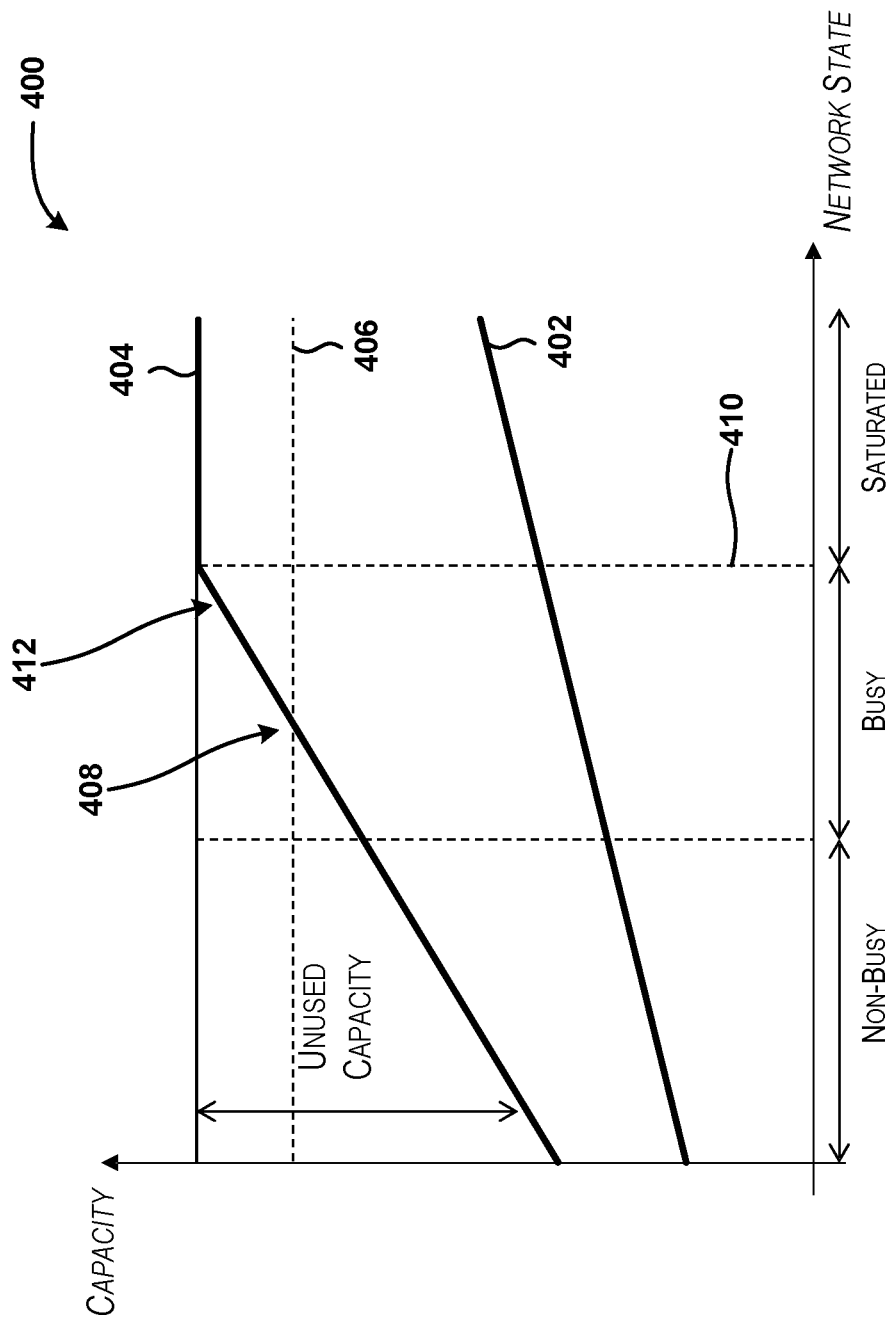
FIGS. 4A-4B are line drawings schematically illustrating methods for providing network capacity planning based on application performance, according to some illustrative embodiments of the concepts and technologies described herein.
Figure 4B:
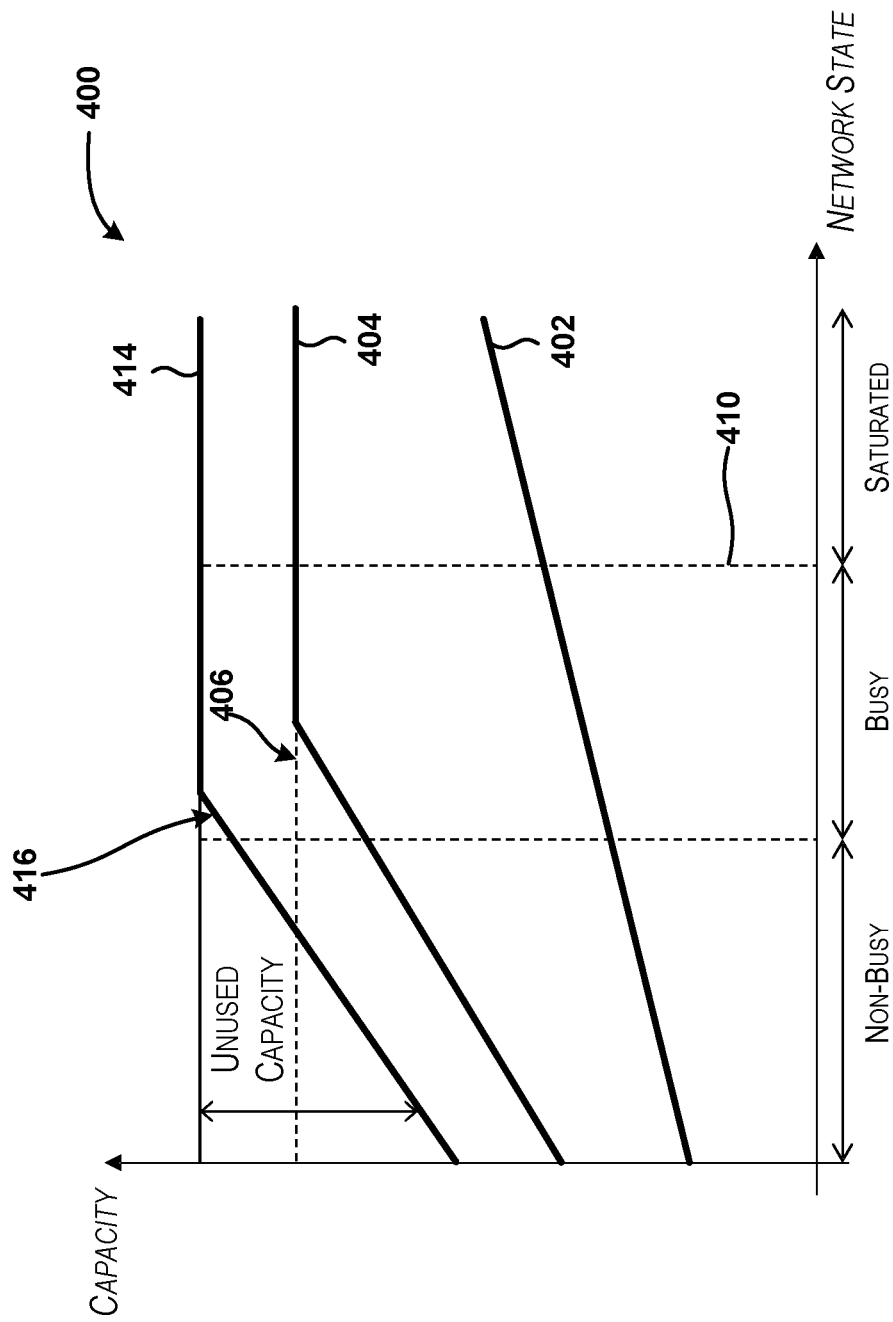

FIGS. 4A-4B are line drawings illustrating additional aspects of the concepts and technologies disclosed herein. In particular, FIG. 4A is a line drawing illustrating various aspects of network capacity planning based on application performance. As shown in FIG. 4A, a graph 400 of network state (x-axis) vs. network capacity (y-axis) can include a non-video data consumption line 402. The non-video data consumption line 402 can correspond to capacity usage of the network 104 for various non-video applications (e.g., mail applications, other applications, and the like). As can be seen in FIG. 4A, as the network 104 gets busier (e.g., moves from non-busy to saturated), the network consumption associated with the non-video traffic can increase linearly. It should be understood that the example non-video data consumption line 402 is illustrative and should not be construed as being limiting in any way.

The graph 400 also can include a video data consumption line 404. The video data consumption line 404 can correspond to capacity usage of the network 104 for video applications (e.g., YOUTUBE video applications, NETFLIX video applications, TIKTOK video applications, or the like). As can be seen in FIG. 4A, as the network 104 gets busier (e.g., moves from non-busy to saturated), the network consumption associated with the video traffic can increase linearly, but at an increased rate relative to the non-video data consumption line 402 (as video applications typically may consume a greater amount of data relative to non-video). Another reason the video data consumption line 404 increases at a greater rate than the non-video data consumption line 402 is that video is elastic, meaning that with adaptive bit rate ("ABR") the video quality and capacity usage can adapt based on available capacity.

Thus, embodiments of the concepts and technologies disclosed herein can forecast video data consumption and non-video data consumption independently to increase QoS associated with video data sessions. Thus, various embodiments of the concepts and technologies disclosed herein can be used to make capacity planning decisions for data sessions associated with video applications. It should be understood that the example video data consumption line 404 is illustrative and should not be construed as being limiting in any way.

As shown in FIG. 4A, the graph 400 also can include a carrier add threshold line 406. This carrier add threshold line 406 can correspond to a network capacity at which networks 104 traditionally would trigger network capacity changes for anticipated capacity demand. The point at which the video data consumption line 404 crosses the carrier add threshold line 406 in the graph 400 can correspond to a traditional capacity increase point 408. It can be appreciated that unused capacity of the network 104 if such a capacity adjustment is made will result from the traditional capacity increase point 408 until the network 104 reaches the line 410 at which network saturation occurs. To avoid this wasted capacity, embodiments of the concepts and technologies disclosed herein are used to base capacity adjustments on QoS of the video applications instead of network capacity triggers. Thus, as shown in FIG. 4A, the graph 400 includes an application-performance-based capacity increase point 412 at which the network 104 increases capacity. This increase is based on the video demands and not capacity of the network 104. Thus, the point at which capacity of the network 104 is increased results in very little unused/wasted capacity and embodiments of the concepts and technologies disclosed herein therefore can reduce costs of operating the network 104 while meeting expected and/or promised QoS for customers. It should be understood that this example is illustrative, and therefore should not be construed as being limiting in any way.

FIG. 4B illustrates another graph 400 that is similar in many respects to the version of the graph 400 shown in FIG. 4A. In FIG. 4B, however, additional aspects of the concepts and technologies disclosed herein are illustrated and described. In particular, the graph 400 illustrates that in some embodiments of the concepts and technologies disclosed herein, network capacity consumption for video usage can be limited to the carrier add threshold line 406 in some instances to protect the network 104 from excessive usage and/or oversaturation. It can be appreciated that the capacity associated with the carrier add threshold line 406 can be moved to any level to protect the network 104, for example by using technologies for congestion aware shaping ("CAS") or the like. It should be understood that this example is illustrative, and therefore should not be construed as being limiting in any way.

Additionally, a premium video data consumption line 414 is shown in FIG. 4B. As illustrated in FIG. 4B, the unused capacity that would result from some implementations of capacity planning can be monetized (e.g., by creating premium level users, etc.). When bandwidth meets a certain threshold, the capacity for that class of users may be increased as shown by the fact that the premium video data consumption line 414 is above the limits imposed on non-premium users (e.g., associated with the video data consumption line 404). Thus, a capacity addition can occur at the premium capacity increase point 416 in some such embodiments to improve QoS for the premium users while protecting the network 104 from oversaturation and/or poor performance by other non-premium users. It should be understood that this example is illustrative, and therefore should not be construed as being limiting in any way.

Figure 5:
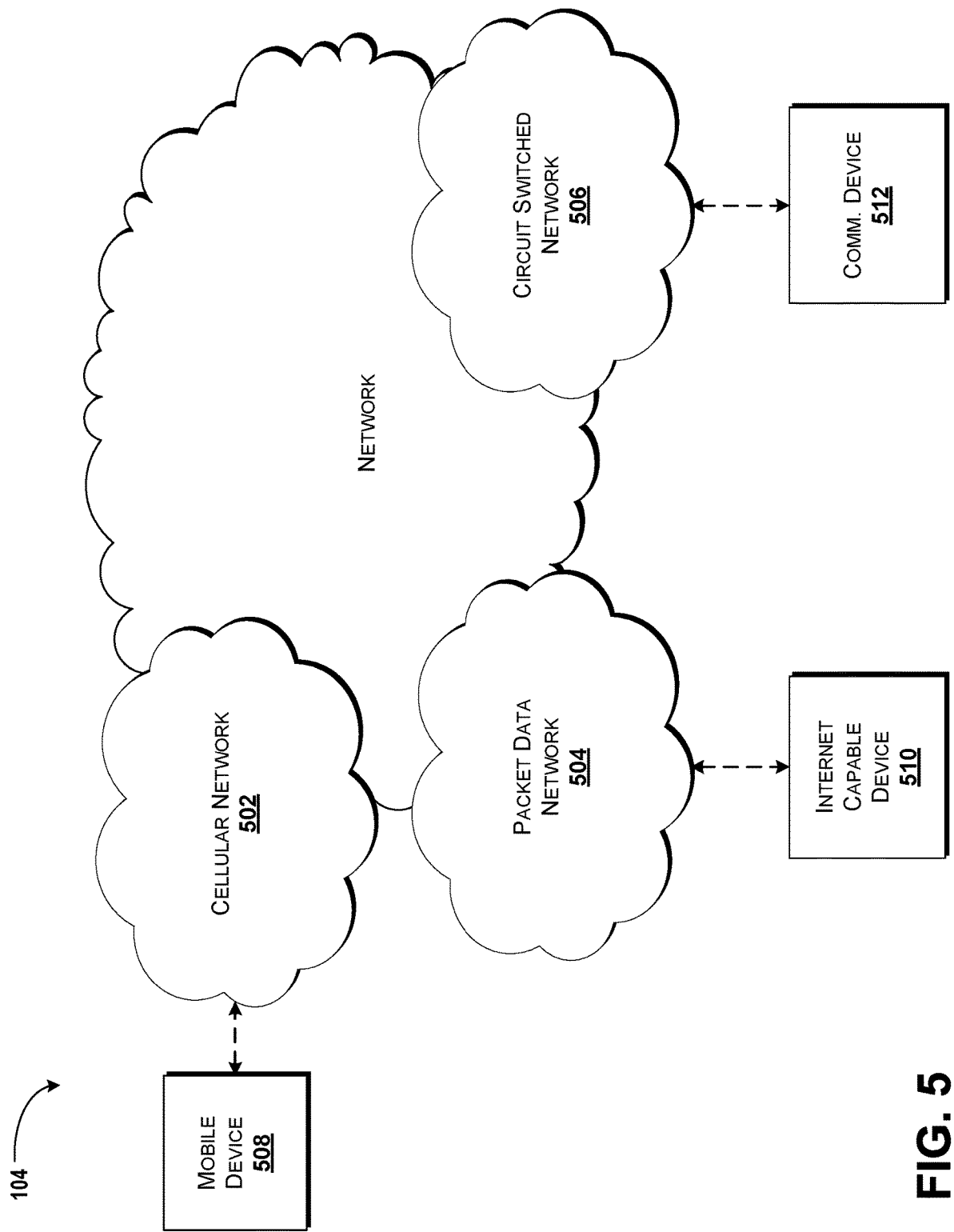
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
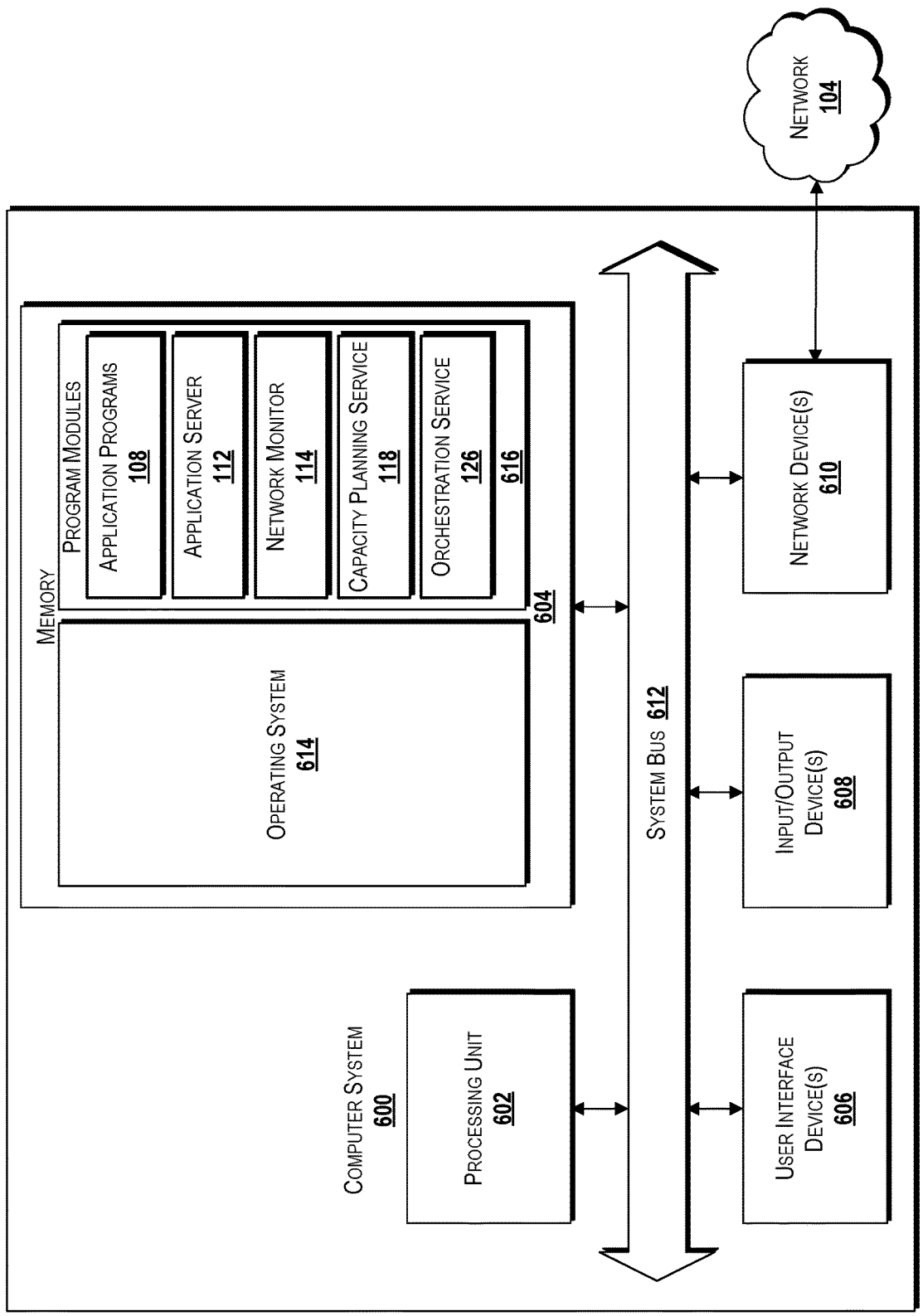
FIG. 6 is a block diagram illustrating an example computer system configured to provide network capacity planning based on application performance, according to some illustrative embodiments of the concepts and technologies described herein.

FIG. 6 is a block diagram illustrating a computer system 600 configured to provide the functionality described herein for providing network capacity planning based on application performance, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the application programs 108, the application server 112, the network monitor 114, the capacity planning service 118, and/or the orchestration service 126. These and/or other programs can be embodied in computer-readable media containing instructions that, when executed by the processing unit 602, perform one or more of the methods 200 and 300 described in detail above with respect to FIGS. 2 and 3 and/or other functionality as illustrated and described herein. It can be appreciated that, at least by virtue of the instructions embodying the methods 200 and 300, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the session data 110, the device activity reports 116, the performance models 122, the commands 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
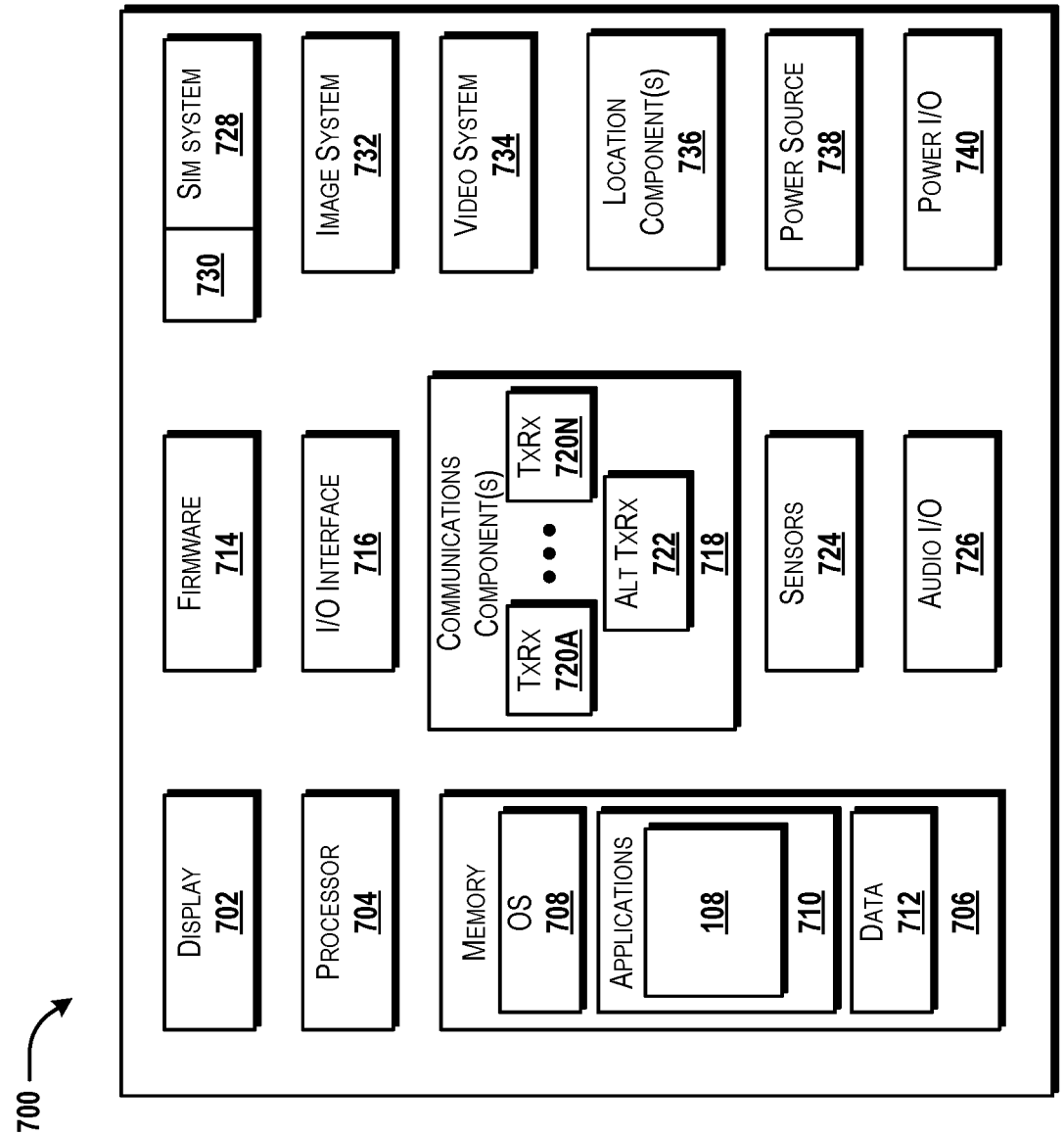
FIG. 7 is a block diagram illustrating an example mobile device configured to generate data for use in network capacity planning based on application performance, according to some illustrative embodiments of the concepts and technologies described herein.

Turning now to FIG. 7, an illustrative mobile device 700 and components thereof will be described. In some embodiments, the user device 102 described above with reference to FIG. 1 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the application programs 108, the application server 112, the network monitor 114, the capacity planning service 118, the orchestration service 126, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, interacting and/or controlling applications such as the application programs 108, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the session data 110, the device activity reports 116, the performance models 122, the commands 124 and/or other data. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, the session data 110, the device activity reports 116, the performance models 122, the commands 124, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
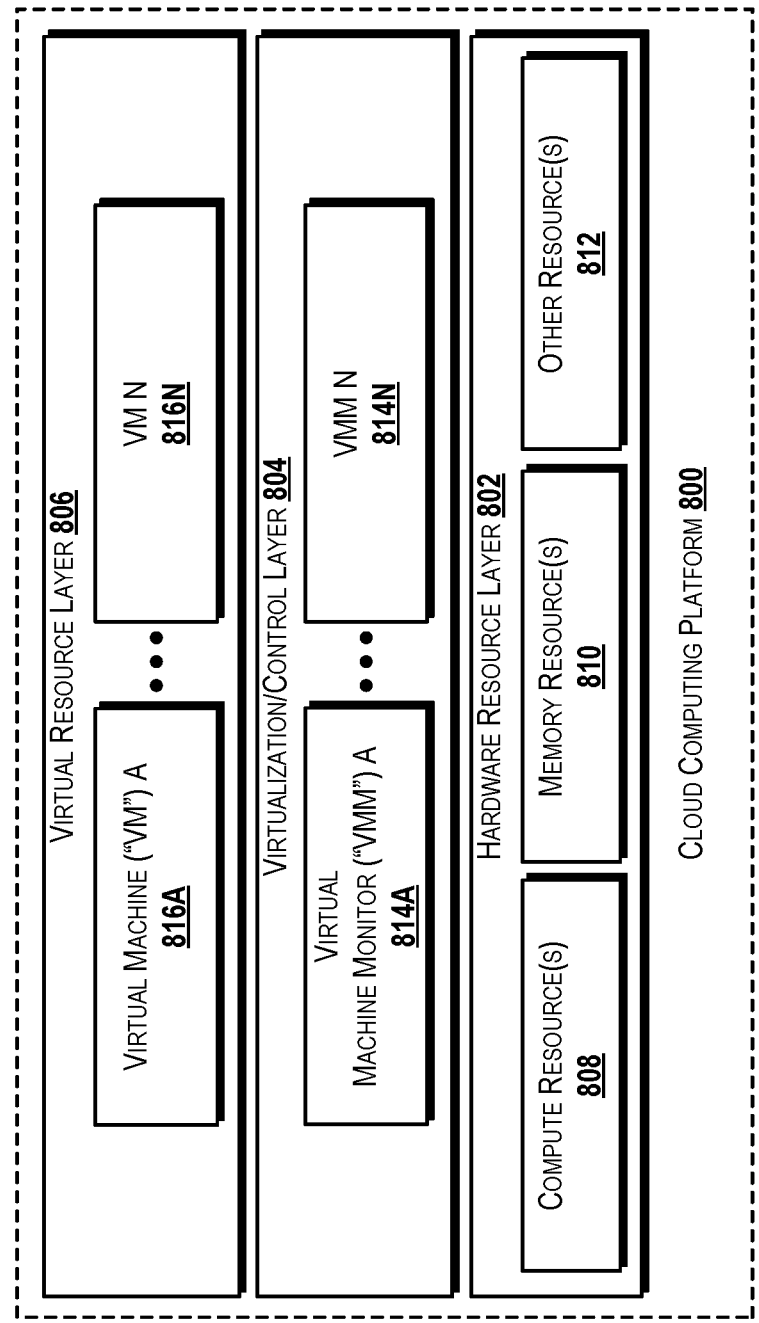
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for network capacity planning based on application performance and/or for interacting with the application programs 108, the application server 112, the network monitor 114, the capacity planning service 118, the orchestration service 126, other applications or services, or the like. Thus, it can be appreciated that in some embodiments of the concepts and technologies disclosed herein, the cloud computing platform 800 illustrated in FIG. 8 can be used to provide the functionality described herein with respect to the user device 102, the application server 112, the network monitor 114, the server computer 120, the orchestration service 126 and/or other devices.

The cloud computing platform 800 thus may be utilized to execute any aspects of the software components presented herein. Thus, according to various embodiments of the concepts and technologies disclosed herein, the application programs 108, the application server 112, the network monitor 114, the capacity planning service 118, the orchestration service 126, other applications or services, or the like can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the operating system 106, the application programs 108, the application server 112, the network monitor 114, the capacity planning service 118, and/or the orchestration service 126 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that the SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the operating system 106, the application programs 108, the application server 112, the network monitor 114, the capacity planning service 118, the orchestration service 126, other applications or services, or the like or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the session data 110, the device activity reports 116, the performance models 122, the commands 124, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for network capacity planning based on application performance have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
detecting a data session occurring on a network between a user device and an application server,
identifying an application being used for the data session, wherein the application comprises a video application,
determining if a performance model for the video application exists, wherein the performance model describes performance metrics and quality of service events associated with the video application,
determining, based on the performance model, a capacity planning trigger for the video application, wherein the capacity planning trigger comprises increasing a network capacity based on the needs and a quality of service associated with the video application during the data session, and
generating a command that, when executed by a network entity, causes the network entity to implement the capacity planning trigger on the network.

2. The system of claim 1, wherein the computer-executable instructions, when executed by the processor, cause the processor to perform the operations further comprising:
receiving a device activity report that comprises session performance metrics for a previous use of the video application, the session performance metrics comprising a further quality of service experienced by the user device during a video session and network capacities during the video session;
determining, based on the device activity report, the performance metrics and the quality of service events associated with the video application;
generating the performance model for the video application based on the performance metrics and the quality of service events; and
storing the performance model.

3. The system of claim 1, wherein the quality of service events comprise a first quality of service experienced at the user device during a video session using the video application and a second quality of service experienced at the user device during the video session using the video application, wherein the first quality of service was experienced when the network was operating at a first capacity level, and wherein the second quality of service was experienced when the network was operating at a second capacity level.

4. The system of claim 1, wherein the data session comprises a video session occurring between the user device and the application server, wherein the application server hosts a video service.

5. The system of claim 1, wherein detecting the data session comprises receiving a device activity report that is generated by a network monitor.

6. The system of claim 1, wherein the network entity comprises an orchestration service, and wherein generating the command comprises generating executable code and sending the executable code to the orchestration service.

7. The system of claim 1, wherein the capacity planning trigger is based on application performance and not based on the network capacity.

8. A method comprising:
- detecting, at a server computer comprising a processor, a data session occurring on a network between a user device and an application server;
- identifying, by the server computer, an application being used for the data session, wherein the application comprises a video application;
- determining, by the server computer, if a performance model for the video application exists, wherein the performance model describes performance metrics and quality of service events associated with the video application;
- determining, by the server computer and based on the performance model, a capacity planning trigger for the video application, wherein the capacity planning trigger comprises increasing a network capacity based on the needs and a quality of service associated with the video application during the data session; and
- generating, by the server computer, a command that, when executed by a network entity, causes the network entity to implement the capacity planning trigger on the network.

9. The method of claim 8, further comprising:
- receiving a device activity report that comprises session performance metrics for a previous use of the video application, the session performance metrics comprising a further quality of service experienced by the user device during a video session and network capacities during the video session;
- determining, based on the device activity report, the performance metrics and the quality of service events associated with the video application;
- generating the performance model for the video application based on the performance metrics and the quality of service events; and
- storing the performance model.

10. The method of claim 8, wherein the quality of service events comprise a first quality of service experienced at the user device during a video session using the video application and a second quality of service experienced at the user device during the video session using the video application, wherein the first quality of service was experienced when the network was operating at a first capacity level, and wherein the second quality of service was experienced when the network was operating at a second capacity level.

11. The method of claim 8, wherein the data session is occurring between the user device and the application server, wherein the application server hosts a video service.

12. The method of claim 8, wherein detecting the data session comprises receiving a device activity report that is generated by a network monitor.

13. The method of claim 8, wherein the network entity comprises an orchestration service, and wherein generating the command comprises generating executable code and sending the executable code to the orchestration service.

14. The method of claim 8, wherein the capacity planning trigger is based on application performance and not based on the network capacity.

15. A computer storage medium having computer-executable instructions stored thereon that, when executed by a processor, cause the processor to perform operations comprising:
- detecting a data session occurring on a network between a user device and an application server;
- identifying an application being used for the data session, wherein the application comprises a video application;
- determining if a performance model for the video application exists, wherein the performance model describes performance metrics and quality of service events associated with the video application;
- determining, based on the performance model, a capacity planning trigger for the video application, wherein the capacity planning trigger comprises increasing a network capacity based on the needs and a quality of service associated with the video application during the data session; and
- generating a command that, when executed by a network entity, causes the network entity to implement the capacity planning trigger on the network.

16. The computer storage medium of claim 15, wherein the computer-executable instructions, when executed by the processor, cause the processor to perform the operations further comprising:
- receiving a device activity report that comprises session performance metrics for a previous use of the video application, the session performance metrics comprising a further quality of service experienced by the user device during a video session and network capacities during the video session;
- determining, based on the device activity report, the performance metrics and the quality of service events associated with the video application;
- generating the performance model for the video application based on the performance metrics and the quality of service events; and
- storing the performance model.

17. The computer storage medium of claim 15, wherein the quality of service events comprise a first quality of service experienced at the user device during a video session using the video application and a second quality of service experienced at the user device during the video session using the video application, wherein the first quality of service was experienced when the network was operating at a first capacity level, and wherein the second quality of service was experienced when the network was operating at a second capacity level.

18. The computer storage medium of claim 15, wherein detecting the data session comprises receiving a device activity report that is generated by a network monitor.

19. The computer storage medium of claim 15, wherein the network entity comprises an orchestration service, and wherein generating the command comprises generating executable code and sending the executable code to the orchestration service.

20. The computer storage medium of claim 15, wherein the capacity planning trigger is based on application performance and not based on the network capacity.

* * * * *